United States Patent
Bombino

(10) Patent No.: US 10,201,842 B2
(45) Date of Patent: Feb. 12, 2019

(54) PIPE BENDING FOR REEL-LAY OPERATIONS

(71) Applicant: Acergy France SAS, Suresnes (FR)

(72) Inventor: Stephane Bombino, Nanterre (FR)

(73) Assignee: Acergy France SAS, Suresnes (FR)

( * ) Notice: Subject to any disclaimer, the term of this patent is extended or adjusted under 35 U.S.C. 154(b) by 545 days.

(21) Appl. No.: 14/775,545

(22) PCT Filed: Mar. 10, 2014

(86) PCT No.: PCT/IB2014/000657
§ 371 (c)(1),
(2) Date: Sep. 11, 2015

(87) PCT Pub. No.: WO2014/140794
PCT Pub. Date: Sep. 18, 2014

(65) Prior Publication Data
US 2016/0030991 A1 Feb. 4, 2016

(30) Foreign Application Priority Data

Mar. 12, 2013 (GB) .................................. 1304424.3

(51) Int. Cl.
*B21D 9/00* (2006.01)
*B21D 9/03* (2006.01)
*F16L 1/20* (2006.01)
*B21D 9/18* (2006.01)

(52) U.S. Cl.
CPC .................. *B21D 9/03* (2013.01); *F16L 1/20* (2013.01); *B21D 9/18* (2013.01)

(58) Field of Classification Search
CPC ... B21D 9/03; B21D 9/05; B21D 9/12; B21D 9/16; B21D 9/18; F16L 1/20
See application file for complete search history.

(56) References Cited

U.S. PATENT DOCUMENTS

| 2,435,904 A | 2/1948 | Robaus |
| 2,777,500 A | 1/1957 | Ekholm et al. |
| 3,105,537 A | 10/1963 | Foster |

(Continued)

FOREIGN PATENT DOCUMENTS

| EP | 0 009 281 | 4/1980 |
| EP | 0 163 056 | 4/1985 |

(Continued)

*Primary Examiner* — Debra Sullivan
(74) *Attorney, Agent, or Firm* — Levy & Grandinetti

(57) ABSTRACT

A method and an apparatus bend a pipe to mitigate internal wrinkling, with particular benefit when bending a lined pipe upon spooling. Bending is performed continuously by advancing the pipe through a bending zone while an internal mandrel is held at the bending zone to resist wrinkling. In one variant, the mandrel includes longitudinally-spaced pipe-engaging elements and a tensile link between the elements allows relative movement between the elements. A hold-back connection on one of the elements applies hold-back force to that element to be transmitted to the other element via the tensile link. In another variant, the mandrel includes an elongate pipe-engaging body with a hold-back connection at one end of the body. The body is flexible to bend with the pipe and is shaped to engage an inner surface of the pipe along most of the length of the body.

22 Claims, 6 Drawing Sheets

(56) References Cited

U.S. PATENT DOCUMENTS

| | | | |
|---|---|---|---|
| 3,649,983 A | | 3/1972 | Ver Nooy |
| 3,650,136 A | | 3/1972 | Sindelar |
| 3,890,693 A | | 6/1975 | Eagleton et al. |
| 3,911,689 A | | 10/1975 | Hogan |
| 4,475,375 A | * | 10/1984 | Hill .......................... B21D 9/03 72/466 |
| 5,192,166 A | | 3/1993 | Persson |
| 2005/0268687 A1 | | 12/2005 | Lorenz |
| 2009/0071222 A1 | | 3/2009 | Iida |

FOREIGN PATENT DOCUMENTS

| | | |
|---|---|---|
| FR | 1056665 | 3/1954 |
| GB | 1 494 204 | 12/1977 |
| GB | 1 517 955 | 7/1978 |
| GB | 2 146 558 | 4/1985 |
| WO | WO 99/64180 | 12/1999 |
| WO | WO 2008/072970 | 6/2008 |
| WO | WO 2010/010390 | 1/2010 |
| WO | WO 2011/048430 | 4/2011 |
| WO | WO 2011/051218 | 5/2011 |

\* cited by examiner

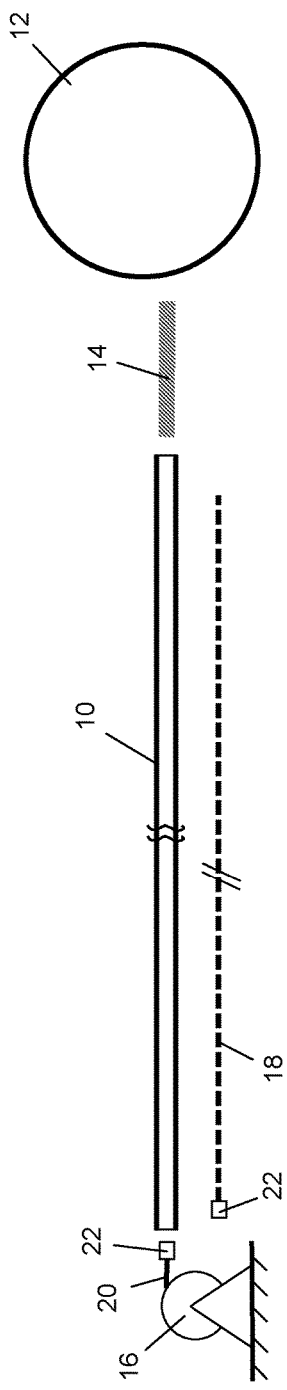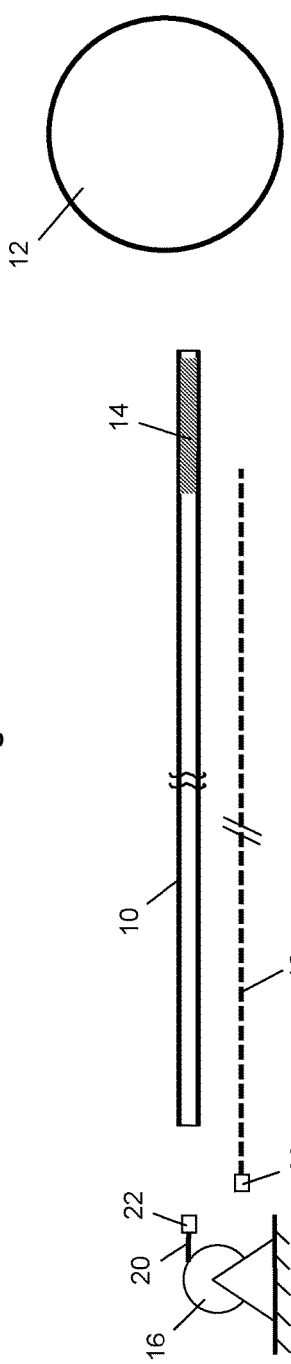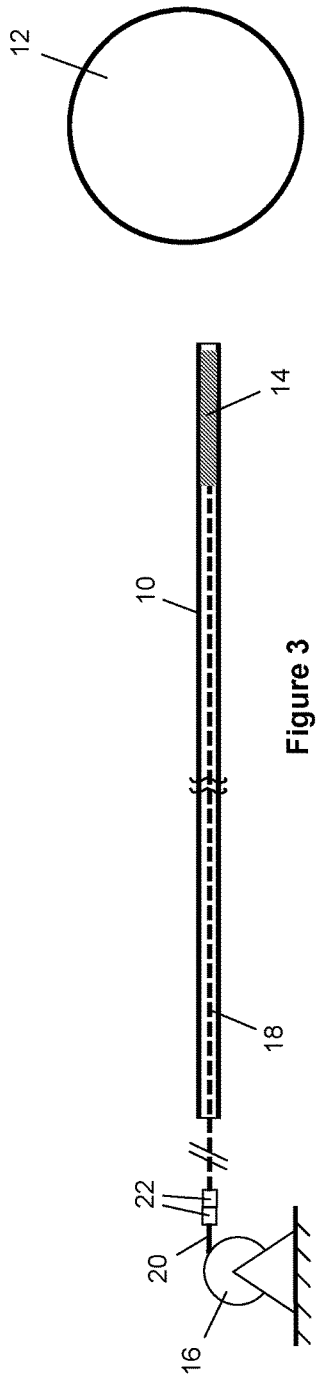

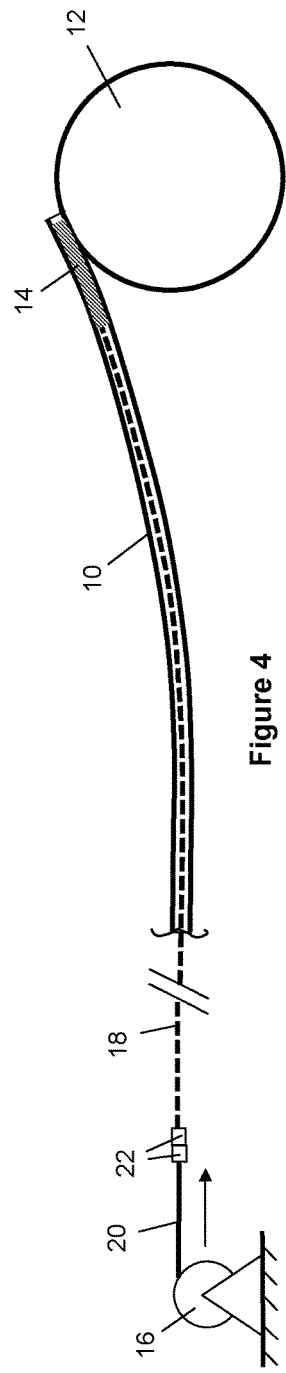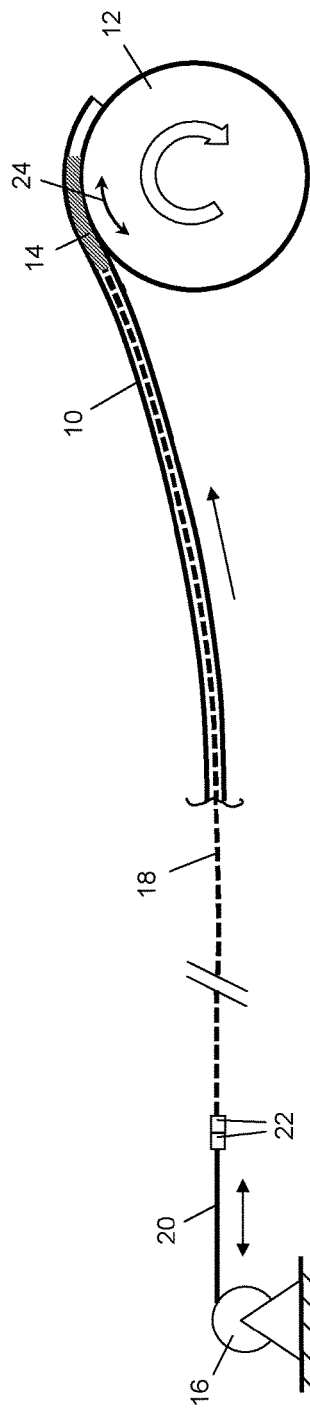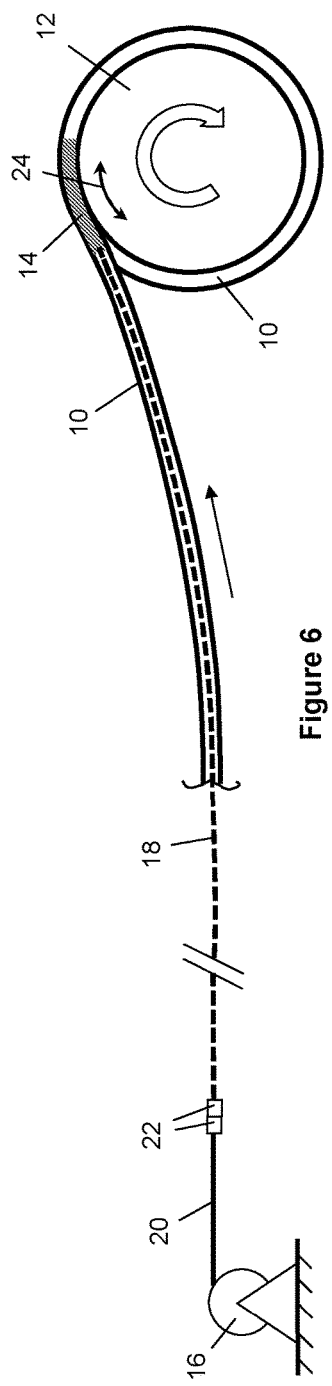

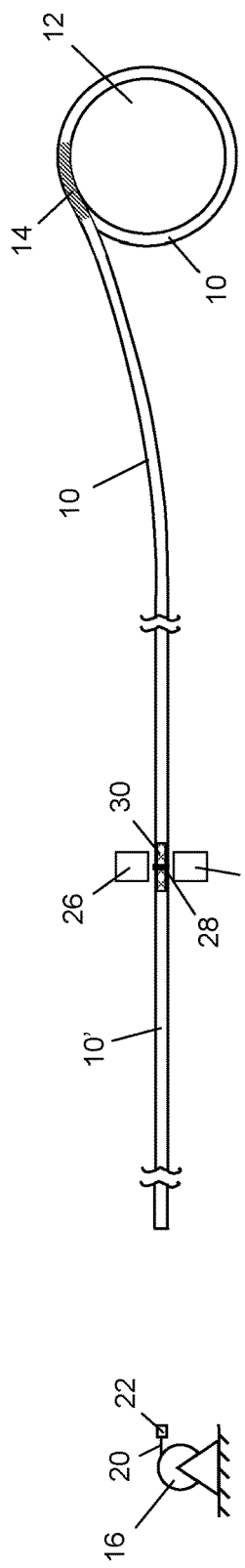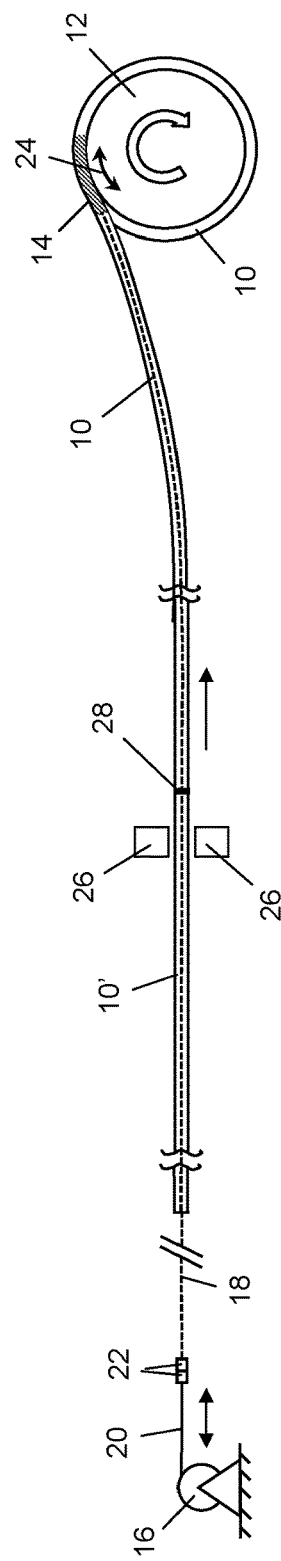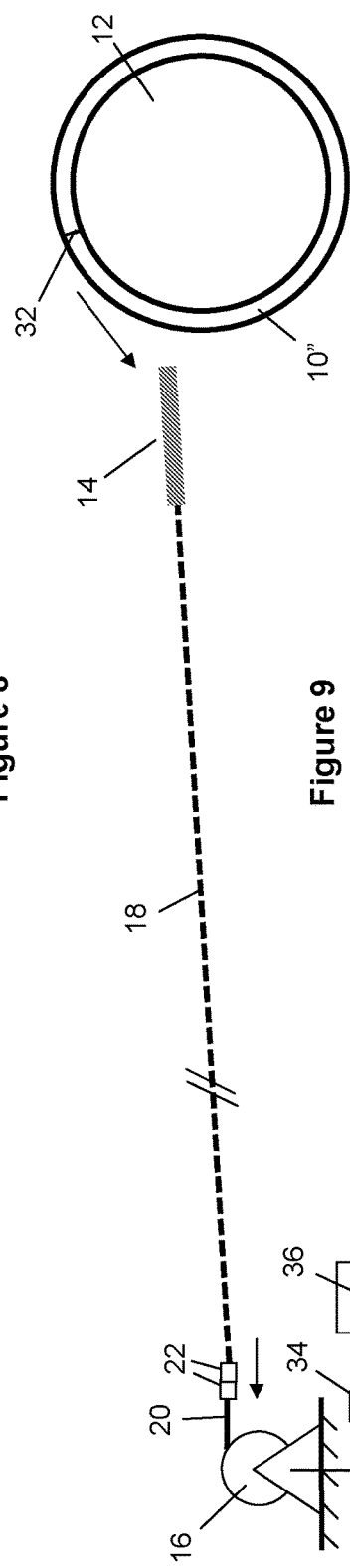

PIPE BENDING FOR REEL-LAY OPERATIONS

This Application is the U.S. National Phase of International Application Number PCT/IB2014/000657 filed on Mar. 10, 2014, which claims priority to GB 1304424.3 filed on Mar. 12, 2013.

BACKGROUND OF THE INVENTION

(1) Field of the Invention

This invention relates to the challenges of bending a pipe during spooling procedures. The invention relates particularly to reel-lay operations for laying subsea pipelines, whose principal application is in the oil and gas industry. However, the invention could have wider application wherever pipes—and especially double-walled lined pipes—undergo continuous, longitudinally-progressive plastic deformation in cold-bending, as is experienced during spooling procedures.

Reel-lay operations involve winding or spooling a continuous pipe formed of welded elements onto a reel of a pipelaying vessel, to be unwound or unspooled subsequently during pipelaying at sea. Fabrication and winding of the pipe typically takes place at a spoolbase that the vessel visits when necessary for loading. It is also possible for a pipe to be wound onto an intermediate storage reel after fabrication at a spoolbase, to be unwound subsequently from the storage reel and simultaneously wound onto a reel of a pipelaying vessel.

Fabricating a pipe for reel-lay operations typically involves welding together pipe joints at a spoolbase to form long straight stalks. The welds between pipe joints are tested and coated and then the resulting stalks are stored beside each other at the spoolbase. When a pipelaying vessel or an intermediate storage reel is ready to be loaded, the stalks are welded together successively end-to-end to create a continuous length of pipe while the pipe is being wound onto the reel of the vessel or onto the intermediate storage reel as the case may be.

Among the various processes involved in producing a spooled pipeline for use in reel lay, the most time-consuming step is welding together two pipeline sections. Reeling typically takes place at about 12-20 meters per minute, so a 1 km pipe stalk would take between one and two hours to spool on to a reel. In contrast, aligning and welding together two sections of pipeline during spooling will typically take about three hours, with a further hour and a half required to provide a field joint coating. This is why it is advantageous to prefabricate stalks for stalk-to-stalk welding and coating during spooling so that the much more numerous joint-to-joint welding and coating operations necessary to fabricate the stalks can be performed while the pipelaying vessel is at sea. However, as will be explained later, the great length of the stalks presents challenges of alignment for welding.

Nominally rigid pipes have enough flexibility to be bent if a minimum bend radius is observed. When spooling, bending extends beyond elastic limits into plastic deformation of the pipe that must be recovered by subsequent straightening processes during laying. Conversely, reel-to-reel transfer of spooled pipe may not require intermediate straightening and so generally involves less deformation, which may be confined to the elastic range.

Bending deformation of a pipe upon spooling develops considerable stresses and strains in the pipe wall, including ovalisation in transverse cross-section. Particular problems arise when bending a lined pipe, which may be required for handling well fluids containing corrosive agents such as hydrogen sulphide and chlorides.

A lined pipe typically comprises a load-bearing, thick-walled, high-strength, outer pipe of low-alloy carbon steel, lined with a thin-walled liner sleeve of a corrosion-resistant alloy (CRA). Plastics liner sleeves are also known. The outer pipe resists buckling during spooling and unspooling and resists hydrostatic pressure when underwater. Conversely, the inner sleeve provides little mechanical strength, being just a few millimeters thick, but it protects the outer pipe from corrosive constituents of fluids carried by the pipe in use.

The use of two different materials in this way recognises that a pipe made entirely from corrosion-resistant material would be prohibitively expensive and yet could lack the essential mechanical properties that are provided by the strong outer wall of a lined pipe.

CRA-lined bimetallic pipes take two forms. The first is 'clad' pipe, in which an internal CRA liner sleeve is metallurgically bonded to the outer pipe. The second is 'mechanically lined pipe' or 'MLP', in which an interference fit between the liner sleeve and the outer pipe fixes the liner sleeve without metallurgical bonding. An example of MLP is supplied by H. Butting GmbH & Co. KG of Germany under the trade mark 'BuBi'.

To produce a length of MLP, a tubular liner sleeve is inserted telescopically into an outer pipe as a sliding fit and both are expanded radially by internal hydraulic pressure applied to the liner sleeve. The expanding liner sleeve undergoes radially-outward plastic deformation to apply radial expansion force to the outer pipe, which undergoes radially-outward plastic or elastic deformation as a result. Once the internal pressure is relaxed, radially-inward elastic shrinkage of the outer pipe onto the plastically-expanded liner sleeve effects a mechanical bond between the outer pipe and the liner sleeve.

MLP benefits from an economical production process that makes it much less expensive than clad pipe. This can save tens of millions of US dollars in a large subsea project considering the many kilometers of lined pipe that may be required. However, MLP is susceptible to problems during spooling that make it difficult to use in reel-lay applications. Specifically, under bending deformation, the thick-walled outer pipe may be structurally stable or undergo slight ovalisation while the thin-walled inner liner sleeve of lower yield strength suffers significant deformation under the combined action of bending and external pressure from the outer pipe. This deformation manifests itself as buckling or wrinkling of the liner sleeve, especially around the intrados or inner curve of the pipe bend. A wrinkled liner sleeve may hinder the smooth flow of well fluids, may decrease fatigue life due to stress concentration and may preclude effective pigging of the pipeline.

In view of the wrinkling problem, the invention is mainly concerned with MLP as opposed to metallurgically-bonded clad pipe for which wrinkling—of the liner at least—is not such a challenge. The invention is also concerned with plastics-lined pipes. Both MLP and plastics-lined pipes are characterised by the possibility of localised longitudinal slippage of the liner sleeve relative to the outer pipe upon bending deformation of the lined pipe, with consequent undesirable deformation of the liner sleeve manifested as wrinkling. However, in a broad sense, the invention could also have benefit when bending clad pipe and indeed when bending unlined pipe, if bending is such as to give rise to unwanted inward deformation of the pipe wall.

(2) Description of Related Art

Wrinkling of the intrados of a pipe bend during bending is a well-known phenomenon. Standards such as ASME 831.3, API 5L and DNV-OS-F-101 recommend that wrinkling should be mitigated by choosing a pipe wall of suitable thickness. However, this approach cannot be applied to double-walled lined pipe in which the outer wall is designed primarily for mechanical strength but the inner wall is designed primarily for corrosion resistance and is made of a material with lower yield strength.

Hot forming is a conventional method to bend both single- and double-walled pipes without wrinkling. In this process, the pipe is heated, for example by induction, before forming or bending. An example is disclosed in GB 2146558. This is not relevant to the invention because of equipment and space constraints in spoolbases and yards and aboard pipelaying vessels.

External mandrels are known to push against the intrados of a pipe bend, hence applying pressure and limiting the appearance of wrinkles. Such mandrels are not relevant to the invention. On spooling, the reel itself acts as an external mandrel by applying radially inward pressure against the outer wall with respect to the central longitudinal neutral axis of the pipe. However, the reel cannot apply radially outward pressure in the opposite direction against the inner wall at the intrados of the bend.

Internal mandrels have been used to resist ovalisation during cold-bending of single-wall pipe, for example as described in U.S. Pat. No. 3,650,136. Conversely, U.S. Pat. No. 2,435,904 discloses heating a lined pipe before bending the pipe, using a longitudinally-curved internal mandrel to expand the pipe radially and to impart the bend. The bent pipe is then cut to produce a discrete bent component such as a pipe elbow that can be welded subsequently into a fabricated pipe structure. However, known internal mandrels do not address or enable bending of a continuous length of pipe when bending is continuous and the region of bending progresses along the pipe, as in a spooling process.

Filling and pressurising a pipe is a commonplace process, for example in the hydrotesting of installed pipe. Indeed, WO 2011/048430 proposes filling a pipeline completely with a pressurised fluid during hydrotesting in the pre-commissioning phase after laying, with the objective of flattening wrinkles after they have formed. This is not relevant to the invention: in fact, it teaches away from the invention, which aims to minimise wrinkles at source.

The use of axially-movable plugs to pressurise a pipeline locally is also known. For example, in GB 1517955 and U.S. Pat. No. 3,890,693, two plugs are used to create a pressurised compartment in the sagbend of a pipeline during S-lay operations; this is to avoid buckling of the pipeline. Again, this solution is used only after wrinkles would already have formed in a reel-lay operation. The distance between the plugs can be varied by virtue of a connecting wire that can be winched in and paid out.

Whilst GB 1517955 and U.S. Pat. No. 3,890,693 teach that their arrangements use inner pressure to strengthen the pipeline locally, the main cause of the buckling problem that they address is external hydrostatic pressure; bending is only partially responsible. So, hydrostatic pressure is more likely to initiate buckling and pipe collapse at bent locations, which is irrelevant to wrinkle mitigation in spooling procedures where the external wall of the pipe is at atmospheric pressure. In addition, the use of plugs requires plug displacement and so introduces undesirable discontinuity by interrupting the process.

U.S. Pat. No. 5,192,166 discloses an S-lay operation that uses internal pigs located in the bend region, with weight loading between the pigs that may include drilling fluid. This uses weight to push down the wall of the pipeline. It does not push internally on the intrados of a pipe bend. In any event, it involves single-walled pipe.

The principle of an internal mandrel has also been used for bimetallic or double-walled pipe to limit wrinkles during bending. For example, EP 0163056 discloses an articulated mandrel for bending double-walled pipeline. The mandrel is an internal solid body that pushes against or blocks growth of potential wrinkles to stop them from forming. More generally, use of a pressurised fluid or a solid material such as ice or sand between mandrels is known from FR 1056665, U.S. Pat. No. 2,777,500, U.S. Pat. No. 3,105,537 and WO 99/64180. For various reasons, these methods are not practical for bending a pipe continuously onto or off a reel at a spoolbase as opposed to forming a single bend under factory conditions. For example, after a few turns upon spooling, the first, leading end of the pipe will become inaccessible under further turns of the pipe.

There are also prior art disclosures relating to reeling of double-walled pipe in the oil and gas industry. Examples are the methods described in WO 20081072970, WO 2010/010390 and WO 2011/051218. These three methods have certain features in common. The pipeline, or at least a substantial part of the pipeline, is filled with a pressurising fluid. Also, one or more plugs are used at the ends of the pipeline. Those plugs have to be removed or displaced periodically.

There are also significant differences between the methods described in WO 2008/072970, WO 2010/010390 and WO 2011/051218. In WO 2008/072970, a new pipe section is welded on, the assembly is filled up with the fluid, the fluid is pressurised and the reel turns to spool the newly-assembled section. In WO 2010/010390, a new section is filled with pressurising fluid and is welded to the existing section. The junction is also filled with pressurising fluid. The fluid is pressurised and the reel turns to spool the newly-assembled section. In WO 2011/051218, the fluid is pressurised in two stages.

The welding step is particularly challenging for CRA-lined pipe because of the need to preserve the integrity of the CRA liner. Alignment of pipe sections before welding requires an internal line-up clamp, for which space must be left inward of the abutting pipe ends; also, provision must be made for extraction of the clamp after use. Alignment becomes significantly more challenging if the pipe sections are filled with a liquid fluid such as water, as liquid greatly increases the weight of the pipe sections and fluid motion within the pipe sections may affect alignment.

U.S. Pat. No. 3,911,689 and GB 1494204 disclose internal pipe-support devices that are anchored by a line to resist inward deformation of the pipe as a whole during bending. Tension is applied to the line to hold the device against frictional force from the advancing pipe. However, the devices are not apt for the purpose of reeling, being too long and being incapable of handling a small, tight bending radius. Also, the devices comprise longitudinally-spaced elements that are not suited to dealing with localised wrinkling or buckling at the intrados.

Specifically, U.S. Pat. No. 3,911,689 and GB 1494204 may be characterised as internal bend restrictors for use in S-lay operations. Their purpose is to rigidify a pipeline internally in the overbend and sagbend regions in order to limit the minimum bending radius or the maximum strain. Their systems are longitudinally rigid so as to determine the bending radius of the pipe. This reduces the risk of the pipe buckling or a concrete coating of the pipe cracking. Thus, they act on the shape of the pipeline in longitudinal section in terms of bending radius rather than in transverse section in the sense of ovality or wrinkling. This means that they address macroscopic problems of bending radius and bending strain rather than localised problems such as wrinkling.

As noted above, U.S. Pat. No. 3,911,689 and GB 1494204 refer to supporting a pipe when laying rather than when reeling. Consequently, the pipe support devices of U.S. Pat. No. 3,911,689 and GB 1494204 are designed for a much greater bend radius than is experienced during reeling. By way of example, a pipeline catenary in a water depth of 1000 m generally has a bend radius of more than 200 m whereas a bending radius an order of magnitude smaller (say 9 m to 13 m) is typical for reeling applications.

Even if they could be used with such a small bending radius, the devices of U.S. Pat. No. 3,911,689 and GB 1494204 would not ensure sufficient contact surface at the bend region so as to apply the correct pressure consistently against the inner wall of the pipeline. For example, U.S. Pat. No. 3,911,689 displays no contact at all in the bending region where there is a gap between two guide carriages. Conversely, GB 1494204 shows a spring, whose purpose is to support the interior of the pipe against buckling. A discontinuous system such as a spring works for the purposes of GB 1494204, provided that the spring is rigid enough to avoid the onset of buckling.

The spring in GB 1494204 is substantially rigid in longitudinal section to rigidify the pipeline and to arrest incipient buckles, but is resiliently deformable and pliant in transverse section. The present invention takes an opposite approach of rigidity in transverse section, so as to apply pressure all around the inner wall of the bend to mitigate wrinkles, and pliancy in longitudinal section to comply with curvature of a reel.

In addition to the aforementioned publications, there are several other documents describing pipe bending techniques which are even less relevant. For instance, US 2009/0071222 describes a method of bending a pipe and controlling wrinkles during bending by feeding granulated sugar particles into the pipe prior to bending to act on an internal surface of the pipe. The particles are then dissolved by a dissolving liquid after the bending operation. Similarly, US 2005268687 describes forming a measuring tube from a tube section by filling the tube section with a first fill substance in the form of a solidified liquid, such as wax, fat, or water, having a melting temperature lower than the melting temperature of the tube section, and a second fill substance of granulated material having a melting temperature which is higher than the melting temperature of the liquid. The first and second fill substances form a core around which the tube is bent by an external force. Following bending, the core is de-solidified to leave the bent measuring tube.

It is against this background that the present invention has been devised.

BRIEF SUMMARY OF THE INVENTION

Broadly, the invention provides a method and apparatus for bending a pipe to mitigate internal wrinkling, with particular benefit when bending a lined pipe upon spooling. Bending is performed continuously by advancing the pipe through a bending zone while an internal mandrel is held at the bending zone to resist wrinkling.

To enable subsequent straightening, spooling a pipe onto a reel typically takes place in a domain between elasticity and pure plastic or rheological behaviour. This typically involves a bending strain (often referred to in the art as 'epsilon') of 1% to 5%, most commonly around 2%.

In one variant, the internal mandrel comprises longitudinally-spaced pipe-engaging elements and a tensile link between the elements allows relative movement between the elements. A hold-back connection on one of the elements applies hold-back force to that element to be transmitted to the other element via the tensile link. In another variant, the internal mandrel comprises an elongate pipe-engaging body with a hold-back connection at one end of the body. The body is flexible to bend with the pipe and is shaped to engage an inner surface of the pipe along most of the length of the body.

More specifically, the invention resides in a method of bending an elongate pipe continuously along a longitudinal axis of the pipe when spooling the pipe onto a reel. The method comprises: advancing the pipe longitudinally through a bending zone where at least part of the pipe undergoes plastic deformation during bending along the longitudinal axis; while the pipe advances through the bending zone, applying tension through an elongate tensile hold-back element that is anchored outside a trailing end of the pipe and extends internally along the pipe to hold an internal mandrel at the bending zone against frictional force arising between the internal mandrel and the pipe advancing past the internal mandrel; and by means of the internal mandrel, resisting radially-inward deformation of an inner surface of the pipe with respect to the longitudinal axis during bending.

The method of the invention is most advantageously performed on lined pipe suitable for use in transporting fluids in subsea installations so as to mitigate wrinkling of a liner sleeve of the pipe.

An external mandrel is preferably used at the bending zone to impart longitudinal bending curvature to the pipe. Advantageously, a reel serves as the external mandrel so that the pipe is bent during spooling onto the reel.

The hold-back element may be attached to the internal mandrel when the internal mandrel is inside the pipe. To enable successive pipe sections to be welded together for spooling, the method of the invention preferably comprises: pausing movement of the pipe through the bending zone; detaching the hold-back element from the internal mandrel; withdrawing the hold-back element from the pipe; attaching an additional pipe section to a trailing end of the pipe; inserting the hold-back element to extend internally along the additional pipe section and the pipe to the internal mandrel; reattaching the hold-back element to the internal mandrel; and resuming movement of the pipe through the bending zone. Advantageously, the pipe and the additional pipe section may be aligned with an internal line-up clamp before attachment.

The internal mandrel can be allowed or caused to bend to match bending curvature of the pipe at the bending zone. For example, angular misalignment may be allowed or caused between longitudinally-spaced pipe-engaging elements of the internal mandrel by flexing or hinging of a link disposed between those elements. Such a link preferably acts in tension.

The internal mandrel may bear against the inner surface of the pipe to resist radially-inward deformation of the inner surface of the pipe. It is also possible for the internal mandrel to apply radially-outward fluid pressure against the inner surface of the pipe to resist radially-inward deformation of the inner surface of the pipe. For example the inner surface of the pipe may be exposed directly to a pressurised fluid confined by longitudinally-spaced seals of the internal mandrel that seal against the inner surface of the pipe.

The internal mandrel may be filled with a substantially incompressible fluid mass and the fluid mass may be pressurised in the internal mandrel after filling. In one example, the fluid mass is confined in a pressure compartment of the internal mandrel and is pressurised by contracting the pressure compartment. Advantageously, the fluid mass may be caused to thicken or solidify when pressurised. The internal mandrel suitably conforms to bending curvature of the pipe at the bending zone before the fluid mass is pressurised.

The longitudinal position of the internal mandrel relative to the bending zone may be adjusted as the pipe advances through the bending zone. Preferably, the internal mandrel is positioned to encompass and extend longitudinally beyond the bending zone along the pipe.

Air pressure may be equalised in the pipe ahead of and behind the internal mandrel by allowing air to flow through the internal mandrel. A pressure-equalisation duct suitably extends longitudinally through the internal mandrel for that purpose.

Hold-back tension applied to the internal mandrel is preferably measured to detect excessive resistance to movement of the pipe past the internal mandrel. If such a condition is detected, the response may be to generate an alarm or to stop movement of the pipe. In the latter case, the internal mandrel may be allowed to move with the pipe while movement of the pipe stops.

To implement the method of the invention, the inventive concept extends to pipe-bending apparatus for bending an elongate pipe section continuously along a longitudinal axis of the pipe section. The apparatus comprises: an internal mandrel arranged to fit inside the pipe section to resist radially-inward deformation of an inner surface of the pipe section with respect to the longitudinal axis during bending; an elongate tensile hold-back element arranged to extend internally along the pipe section from an external anchor to the internal mandrel to hold the internal mandrel at a bending zone as the pipe section advances longitudinally past the internal mandrel; an external mandrel defining the bending zone; and a drive for advancing the pipe section through the bending zone; wherein a reel serves both as the external mandrel and as the drive.

The anchor is preferably spaced from the external mandrel to accommodate the pipe section between the anchor and the external mandrel.

To position the internal mandrel appropriately, a variable-length connection is preferably provided between the internal mandrel and the anchor. The anchor may be a winch, in which case the variable-length connection is suitably a winch wire.

The inventive concept embraces an internal mandrel for resisting radially-inward deformation of an inner surface of a pipe during bending of the pipe along a longitudinal axis.

In some embodiments of the invention, the internal mandrel comprises: longitudinally-spaced pipe-engaging elements; a tensile flexible or hinging link disposed between the elements to allow relative angular movement between the elements as the pipe bends; a hold-back connection on one of the elements to apply hold-back force to that element to be transmitted in use to the other element by tension in the tensile link; wherein a pressure compartment is defined between the pipe-engaging elements; wherein the pressure compartment contains a fluid mass; and wherein the fluid mass comprises a gel, wax, or granular filler material.

At least one of the pipe-engaging elements is suitably a pipeline pig. In that case, the pig may comprise longitudinally-spaced cups arranged to seal against the inner surface of the pipe. It is also possible for the pig to comprise a foam body arranged to seal against the inner surface of the pipe.

The fluid mass may have pseudo-plastic properties under pressure. A filling port may extend longitudinally through at least one of the pipe-engaging elements to communicate with the pressure compartment.

Elegantly, the link between the pipe-engaging elements may be of variable length to change the volume of the pressure compartment. For example, an actuator acting between the pipe-engaging elements may effect relative movement between those elements.

The inventive concept also encompasses: a spoolbase equipped with the apparatus or the internal mandrel of the invention; pipe bent by the method of the invention, using the apparatus of the invention or using an internal mandrel of the invention; a reel loaded with such pipe; and a subsea installation comprising pipe unspooled from such a reel.

BRIEF DESCRIPTION OF THE SEVERAL VIEWS OF THE DRAWINGS

In order that the invention may be more readily understood, reference will now be made, by way of example, to the accompanying drawings in which:

FIG. 1 is a schematic side view showing, separately, features to which reference will be made in the spooling procedure illustrated in a series of schematic side views in FIGS. 2 to 9;

FIG. 2 shows the beginning of a spooling procedure in accordance with the invention, in which an internal mandrel of the invention has been inserted into a leading end of a first pipe stalk to be spooled onto a reel;

FIG. 3 shows the mandrel now connected by a hold-back wire extending along the pipe stalk to a winch located beyond a trailing end of the pipe stalk;

FIG. 4 shows the leading end of the pipe stalk containing the mandrel lifted on to the reel to initiate spooling;

FIG. 5 shows spooling underway as the reel turns white the mandrel is held back by the winch acting through the hold-back wire;

FIG. 6 shows spooling continuing as the pipe stalk is wound in successive coils around the reel while the mandrel remains substantially stationary with respect to the circumference of the reel;

FIG. 7 shows a second pipe stalk being welded to the trailing end of the first pipe stalk while the reel is stationary in an interruption of spooling;

FIG. 8 shows the second pipe stalk advancing toward the reel after welding, as the reel turns following resumption of spooling;

FIG. 9 shows the conclusion of the spooling procedure, in which the winch is used to pull the mandrel from the trailing end of a final pipe stalk that has been wound onto the reel;

DETAILED DESCRIPTION OF THE INVENTION

Figure 10:
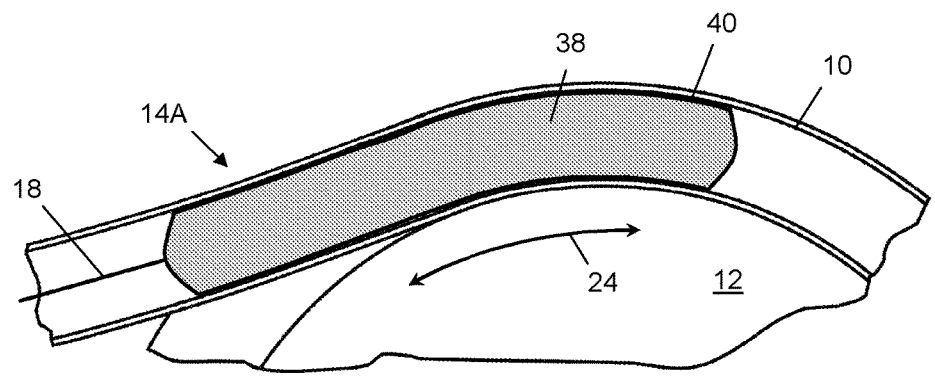
FIG. 10 is a schematic side view of a first embodiment of an internal mandrel in accordance with the invention, in use during the spooling procedure of the invention.

Referring firstly to FIG. 1, this shows schematically a pipe stalk 10 that may be a kilometer or more in length. The pipe stalk 10 is the first of a succession of similar pipe stalks that may be welded end-to-end and spooled onto a reel 12 in the spooling process of the invention. The reel 12 acts as an external mandrel to bend the pipe stalk 10 during spooling. In practice, various guides will be used to direct the pipe stalk 10 as it advances onto the reel 12 but these have been omitted from the drawings for clarity.

The pipe stalk 10 is prefabricated from multiple joints of lined pipe comprising a thick-walled outer pipe of low-alloy carbon steel lined internally with a thin-walled liner sleeve of a corrosion-resistant alloy. Advantageously in cost terms, the pipe is of the mechanically-lined MLP type but, as explained previously, spooling MLP presents difficult challenges if serious wrinkling of the liner sleeve is to be avoided. To overcome this problem, the invention employs an innovative internal mandrel 14 that is shown schematically in FIGS. 1 to 9 and in more detail in various embodiments in FIGS. 10 to 16, which will be described later.

The components of the system shown in FIG. 1 further comprise a hold-back system exemplified here by a winch 16 and a hold-back wire or cable 18 that is somewhat longer than the pipe stalk 10. At its trailing end, the hold-back wire 18 can be coupled releasably to the winch wire 20 by shackles 22. At its leading end, the hold-back wire 18 can also be coupled releasably to the trailing end of the mandrel 14, for example by further shackles that have been omitted from these drawings for clarity.

Steel is preferred for the hold-back wire 18 in view of its low elasticity. Whilst the hold-back wire 18 is shown schematically as extending along the central longitudinal axis of the pipe stalk 10, in practice it will make contact with the inner surface of the pipe stalk 10 at some locations. Consequently, the hold-back wire 18 is preferably covered by an outer plastics sheath to minimise potential friction and damage wherever the hold-back wire 18 rubs against the inner surface of the pipe stalk 10 in use.

For the purpose of a high-level description of the process in relation to FIGS. 2 to 9, it is sufficient to note that the mandrel 14 is generally in the form of an elongate cylinder of circular cross-section and is dimensioned to be a close sliding fit within the pipe stalk 10. In essence, the mandrel 14 is a form of pipeline pig. Indeed, features of known pigs can be adapted to make a mandrel 14 as will be explained later.

By the use of the hold-back system exemplified here by the winch 16 acting via the hold-back wire 18, the mandrel 14 is held steady at and around the arc portion where plastic deformation of the pipe stalk 10 takes place upon spooling onto the reel 12. The pipe stalk 10 slides around and past the mandrel 14 while the mandrel 14 continuously resists wrinkle formation at the region of plastic deformation as, in relative terms, the mandrel 14 and the region of plastic deformation regress along the pipe stalk 10 during spooling.

Consequently, the mandrel 14 must be capable of bending along its central longitudinal axis—which, in use, coincides with the central longitudinal neutral axis of the pipe stalk 10—to conform to corresponding bending experienced by the pipe stalk 10 during spooling. However, to mitigate wrinkling, the mandrel 14 must resist radially-inward deformation of the wall of the pipe stalk 10, and particularly its liner sleeve, toward the neutral axis of the pipe stalk 10. Thus, in use, the mandrel 14 applies pressure or reaction force in a radially-outward direction against the inner wall of the pipe stalk 10. This is required especially in the intrados of the pipe bend where bending of the pipe stalk 10 takes place upon spooling onto the reel 12.

For this purpose, the mandrel 14 may be substantially rigid in use when positioned at the region of plastic deformation of the pipe stalk 10 during spooling, at least in relation to radially-inward force applied by the wall of the pipe stalk 10. Alternatively, the mandrel 14 may define a pressure chamber that applies fluid pressure radially outwardly against the inner wall of the pipe stalk 10 when positioned at the region of plastic deformation of the pipe stalk 10 during spooling. Both possibilities feature among the embodiments shown in FIGS. 10 to 16.

At the beginning of the spooling procedure as shown in FIG. 2, which procedure is typically performed at a spool-base, the mandrel 14 is inserted into a leading end of the pipe stalk 10. Next, the hold-back wire 18 is coupled to the trailing end of the mandrel 14 to extend along the interior of the pipe stalk 10. This can be achieved by passing a messenger line comprising a synthetic rope, a light cable or a soft sling through the pipe stalk 10. A messenger line can be pulled by a pipeline pig passed through the pipe stalk 10 for pressure testing.

A length of the hold-back wire 18 left protruding from the trailing end of the pipe stalk 10 is coupled to the winch wire 20 by the shackles 22 as shown in FIG. 3. In an alternative approach, it would be possible instead first to couple the hold-back wire 18 to the mandrel 14 and through the pipe stalk 10 to the winch wire 20 so that the winch 16 can pull the mandrel 14 into the leading end of the pipe stalk 10.

As the winch wire 20 is paid out as shown in FIG. 4, the leading end of the pipe stalk 10 containing the mandrel 14 is lifted on to the reel 12 to initiate spooling. The mandrel 14 bends slightly to conform to the slight elastic deformation of the pipe stalk 12 as the pipe stalk 12 sags under its own weight. FIG. 5 then shows spooling underway as the reel 12 turns while the mandrel 14 is held back by the winch 16 acting through the hold-back wire 18. The hold-back wire 18 is then under tension applied by friction forces as the pipe stalk 10 slides past the mandrel 14.

The winch wire 20 is paid out and reeled in as necessary at the start of spooling to position the mandrel 14 at a required angular position relative to the circumference of the reel 12. In this respect, a key insight of the invention is that wrinkling of the liner sleeve is only likely to occur in a small region of arc around the circumference of the reel 12 where the pipe stalk 10 undergoes bending and so may suffer ovalisation and wrinkling. Once plastic deformation of the pipe stalk 10 has taken place to match the effective radius of the reel 12, allowing for the thickness of any coils of pipe already layered underneath, the pipe stalk 10 will undergo no further deformation that is likely to give rise to ovalisation or wrinkling.

Consequently, it is sufficient for the mandrel 14 to extend around only a minor portion of the circumference of the reel 12, provided that the mandrel 14 is kept in alignment with the angular position at which plastic deformation of the liner sleeve will take place where the pipe stalk 10 starts to spool onto the reel 12. Thus, the mandrel 14 is preferred to cover 10° to 90°—most preferably just 30° to 45°—of the circumference described by the pipe stalk 10 when it is bent for spooling onto the reel 12. The mandrel 14 is positioned such that the arc portion defined by its length will encompass the smaller arc portion in which plastic deformation of the pipe stalk 10 initiates, progresses and ends upon spooling onto the reel 12.

This arc portion in which plastic deformation of the pipe stalk 10 initiates, progresses and ends upon spooling onto the reel 12 will be referred to hereafter as the bending zone 24. The bending zone 24 starts just before the pipe stalk 10 encounters the reel 12 as it is pulled toward the reel 12 and ends within a few degrees of arc after the reel 12 first bears against the pipe stalk 10 like an external mandrel. Of course, where appropriate, references in this specification to the reel 12 include any layers of pipe already spooled onto the reel 12, which determine the effective radius, and hence the effective circumference, of the reel 12.

When so positioned, a trailing end of the mandrel 14 extends back a few meters, for example up to five meters, along the pipe stalk 10 upstream of the bending zone 24. Conversely, a leading end of the mandrel 14 extends several degrees of arc downstream of the bending zone 24. The resulting extra length of the mandrel 14 provides some tolerance of position in the event of the hold-back wire 18 lengthening unpredictably, or to a lesser extent than predicted, under tension applied by friction forces as the pipe stalk 10 slides past the mandrel 14. However, it is preferred that the mandrel 14 is not much longer than necessary, as this will minimise friction between the mandrel 14 and the pipe stalk 10.

FIG. 6 shows spooling continuing as the pipe stalk 10 is wound in successive coils around the reel 12 while the mandrel 14 remains substantially stationary with respect to the circumference of the reel 12, in alignment with the bending zone 24. Layers of the pipe stalk 10 are built up by successive coils with each revolution of the reel 12. For ease of illustration, only one layer of the pipe stalk 10 is shown on the reel 12 in the drawings although, in practice, there will of course be several layers when the reel 12 is fully loaded.

Eventually, the trailing end of the pipe stalk 10 nears the reel 12 and if the reel 12 is not yet fully loaded, it is necessary to stop turning the reel 12 and add another pipe stalk 10'. This is done by decoupling the hold-back wire 18 from the mandrel 14 and removing it from the pipe stalk 10, as shown in FIG. 7, whereupon the leading end of the next pipe stalk 10' can be aligned with the trailing end of the preceding pipe stalk 10 at a welding and coating station 26 to form a welded and coated field joint 28. It will be appreciated that the pipe stalks 10, 10' are empty of liquid throughout for ease of alignment; also, the invention allows an internal line-up clamp 30 to be used and extracted in a well-known manner.

Once the weld is complete and the field joint coating has solidified to a self-supporting extent, spooling can resume as shown in FIG. 8. Here, the hold-back wire 18 has been coupled again to the mandrel 14 and the reel 12 is turning to advance the pipe stalks 10, 10', which puts the hold-back wire 18 under tension due to frictional forces acting on the mandrel 14. Again, the winch wire 20 is paid out and reeled in as necessary to position the mandrel 14 at the required angular position relative to the circumference of the reel 12, in alignment with the bending zone 24.

The steps shown in FIGS. 7 and 8 can be repeated for any subsequent pipe stalks 10". Eventually, the last pipe stalk 10" is spooled on the reel 12 as shown in FIG. 9, whereupon turning of the reel 12 is stopped and the winch 16 pulls on the hold-back wire 18 to extract the mandrel 14 from the trailing end 32 of that pipe stalk 10". The mandrel 14 may then be checked and prepared for re-use in a future spooling procedure.

The winch 16 is shown in FIG. 9 to include a tension sensor 34 for measuring tension in the hold-back wire 18 to detect if the mandrel 14 becomes jammed inside a pipe stalk 10. If such a condition is detected, a control system 36 responsive to the tension sensor 34 should raise an alarm and may shut down spooling automatically.

In the event of a jammed mandrel 14 where a winch 16 is employed as the hold-back device, it may be beneficial for the winch wire 20 to pay out so that the jammed mandrel 14 can move with the pipe stalk 10 while the spooling procedure comes to a halt, to avoid damage to the mandrel 14, the pipe stalk 10 or other elements of the system.

Figure 14:
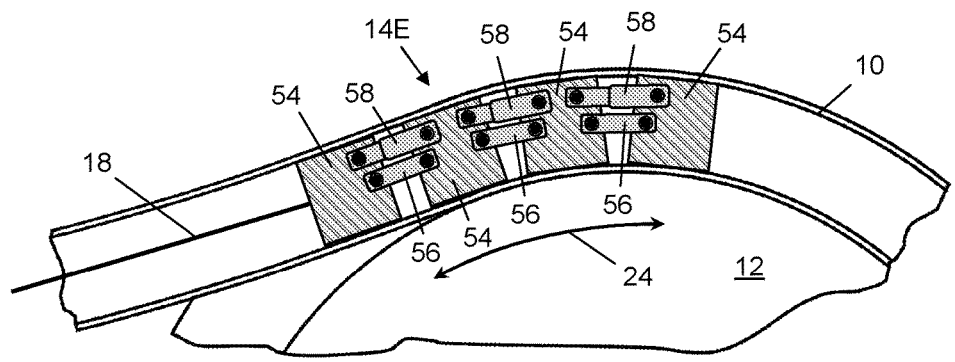
FIG. 14 is a schematic side view of a fifth embodiment of an internal mandrel in accordance with the invention, in use during the spooling procedure of the invention.
Figure 15A:
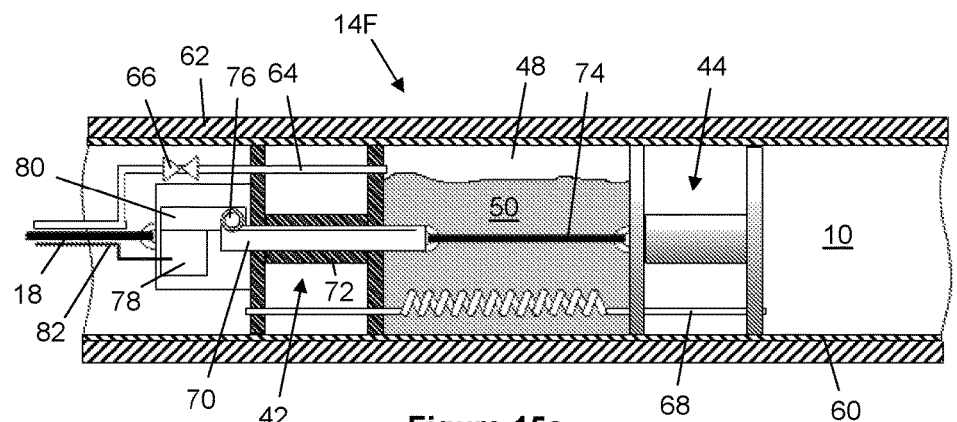
FIGS. 15a and 15b are enlarged detailed side views of a sixth embodiment of an internal mandrel in accordance with the invention, shown respectively in expanded and contracted states.
Figure 15B:
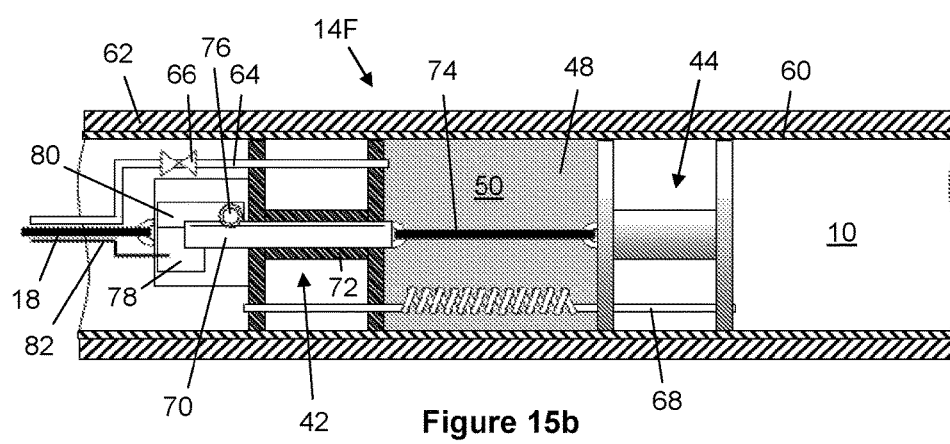
Figure 16:
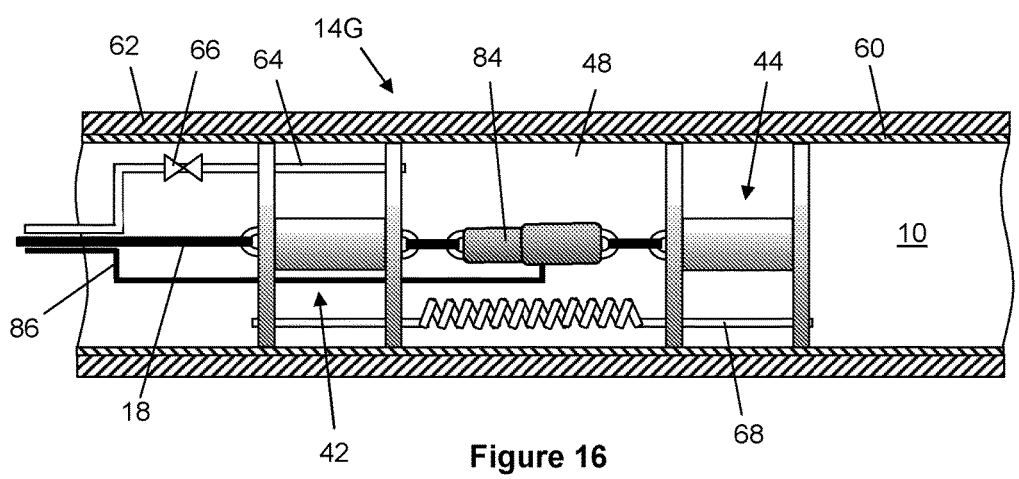
FIG. 16 is an enlarged detailed side view of a seventh embodiment of an internal mandrel in accordance with the invention.

FIGS. 10 to 16 show first to seventh embodiments of the mandrel 14 by way of example, numbered for convenience as 14A to 14G respectively. In FIGS. 10 to 14, mandrels 14A to 14E are shown at the same angular position relative to the circumference of the reel 12 as shown in FIGS. 5 to 8. Here, the mandrels 14A to 14E are positioned in a bent pipe stalk 10 to encompass the bending zone 24. Conversely, FIGS. 15a, 15b and 16 show mandrels 14F and 14G in a straight pipe stalk 10 before bending.

The mandrel 14A shown in FIG. 10 is a pig comprising a body 38 of a resilient pliant polymer material such as polyurethane. The body 38 is cylindrical and has rounded or tapered ends. The body 38 has a foam interior and a flexible but relatively solid and unyielding skin 40 to hold the inner wall of the pipe stalk 10 in place during plastic deformation upon spooling. The skin 40 of the body 38 is preferably smooth to minimise friction and to improve wear characteristics; it may be coated, impregnated or otherwise provided with a low-friction material such as PTFE.

The material and elongate shape of the body 38 are such that the body 38 is easy to bend along its central longitudinal axis to conform to the local curvature of the pipe stalk 10. However, the cross-section of the body 38 is resistant to radially-inward pressure toward the central longitudinal axis, as would be exerted by wrinkling deformation of the liner sleeve that defines the inner wall of the pipe stalk 10.

Like all mandrels of the invention, the mandrel 14A must be flexible enough or loose-fitting enough to slide past the circumferential inward protrusion of girth welds between successive pipe stalks 10, where the liner is metallurgically bonded to the outer pipe around the weld location.

Figure 11:
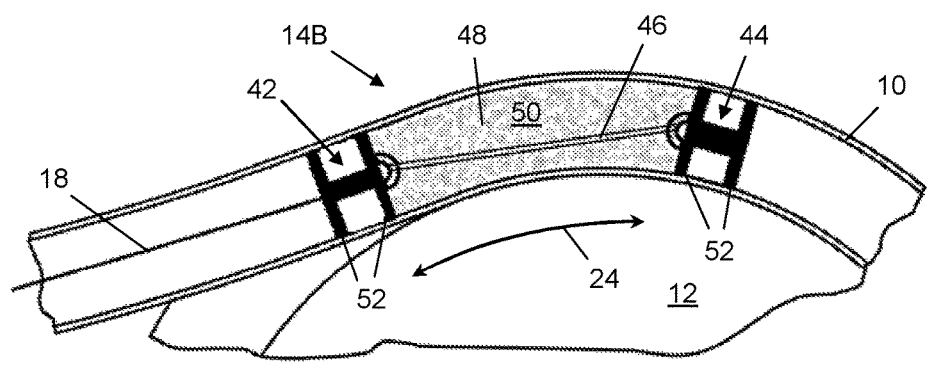
FIG. 11 is a schematic side view of a second embodiment of an internal mandrel in accordance with the invention, in use during the spooling procedure of the invention.
Figure 12:
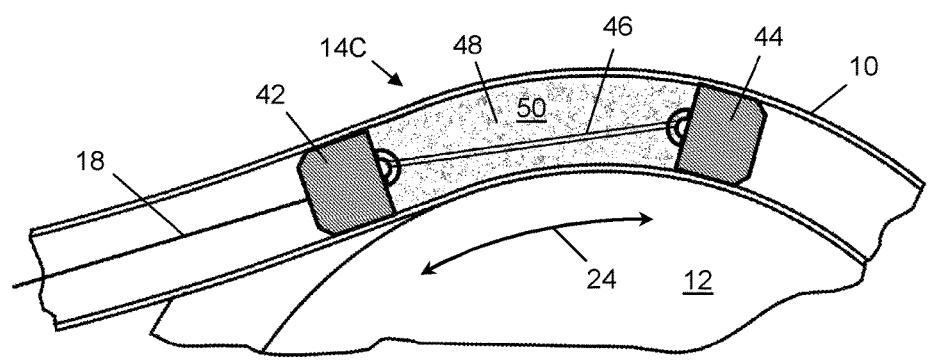
FIG. 12 is a schematic side view of a third embodiment of an internal mandrel in accordance with the invention, in use during the spooling procedure of the invention.

In the second and third embodiments shown in FIGS. 11 and 12, the mandrels 14B and 14C are pig trains comprising leading and trailing pigs 42, 44 connected by a tensile link 46. The hold-back wire 18 is attached to the leading pig 42 such that the leading and trailing pigs 42, 44 are disposed, respectively, proximally and distally with respect to the hold-back wire 18 or upstream and downstream with respect to the direction in which the pipe stalk 10 advances onto the reel 12.

The tensile link 46 distinguishes the mandrels 14B, 14C from conventional propelled pig trains. The link 46 allows relatively rigid parts of the mandrels 14B, 14C, namely the pigs 42, 44, to move angularly relative to each other to provide pliancy in bending along a central longitudinal axis, while preventing those parts moving apart longitudinally.

Where the leading and trailing pigs 42, 44 seal against the inner wall of the pipe stalk 10, a pressure compartment 48 is defined between them. The pressure compartment 48 can be filled with a fluid mass 50 and can hold that fluid mass 50 under elevated pressure to bear radially outwardly against the inner wall of the pipe stalk 10. This resists wrinkling deformation of the liner sleeve that defines the inner wall of the pipe stalk 10.

The tensile links 46 shown in FIGS. 11 and 12 are flexible wires or cables tied between the leading and trailing pigs 42, 44. The links 46 may instead be rigid metal rods with swivel connections to the leading and trailing pigs 42, 44.

The pressure compartment 48 may be filled by various fluid filler materials: for example, liquids, gels and granular particulate materials that behave as fluids when in bulk.

FIG. 11 shows schematically that the elements of the pig train may comprise conventional bidirectional pigs 42, 44 with pliant plastic cups 52 defining circumferential seals, which is preferred. However, various pigs known in the art for pipe cleaning and commissioning purposes would be suitable for this application, provided that they ensure enough leak-tightness for the fluid material chosen to fill the pressure compartment 48. Solid pigs and foam pigs 42, 44 such as those shown in FIG. 12 may be possible depending on the choice of fluid material. Alternatively, an evolution of a pig adapted for curved pipelines as disclosed in U.S. Pat. No. 3,649,983 could be considered.

Figure 13:
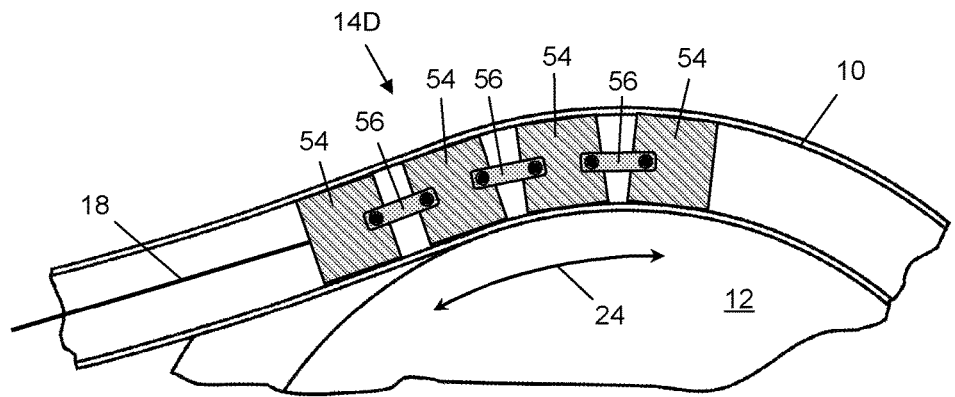
FIG. 13 is a schematic side view of a fourth embodiment of an internal mandrel in accordance with the invention, in use during the spooling procedure of the invention.

In the fourth and fifth embodiments shown in FIGS. 13 and 14, mandrels 14D and 14E respectively comprise a longitudinal series of rigid segments 54 connected to their neighbour(s) by articulating links 56 disposed on the central longitudinal axis. The segments 54 are a close sliding fit inside the pipe stalk 10. Articulated or flexible links between rigid elements of a mandrel 14 are another way of combining pliancy in bending along a central longitudinal axis with strong resistance to radially-inward pressure toward that axis, which is characteristic of wrinkling deformation of a liner sleeve.

Bending of the mandrel 14D along a central longitudinal axis in FIG. 13 occurs passively in response to corresponding bending of the pipe stalk 10. Conversely, FIG. 14 shows that bending of the mandrel 14E along its central longitudinal axis could be controlled actively, for example by extensible double-acting actuators 58 between neighbouring segments 54 of the mandrel 14E acting on a line offset laterally from the central longitudinal axis where the articulating links 56 are located. Such actuators 58 may be used to press rigid elements of a mandrel 14 against the inner surface of a pipe stalk 10.

If the segments 54 are sufficiently close together, there is no need for a pressurised fluid to be disposed between the segments 54 to combat wrinkling. In this respect, it is helpful that the segments 54 are at their closest at the intrados of the bend in the pipe stalk 10, where wrinkling would otherwise be most prevalent.

In the sixth and seventh embodiments of the invention shown in FIGS. 15a, 15b and 16, mandrels 14F and 14G include provision to vary the length of a link between pigs 42, 44, for example with a jack, an adjustable screw mechanism or a bolt mechanism powered by a motor and gearbox. This increases or decreases the length and hence the volume of a pressure compartment 48 by varying the length of the link. It will be evident that reducing the volume of the pressure compartment 48 increases the pressure of a fluid mass 50 that is confined within that compartment 48. In this respect, the pressure compartment 48 may be understood as a compartment in which a fluid mass 50 of an incompressible material can be packed when inward pressure is applied.

The enlarged views of FIGS. 15a, 15b and 16 show the liner sleeve 60 within the outer pipe 62 of the pipe stalk 10.

The mandrels 14F, 14G of FIGS. 15a, 15b and 16 employ leading and trailing pigs 42, 44 as pistons that are drawn or pushed together to pack and preferably solidify an incompressible fluid mass 50 of filling material in the pressure compartment 48 defined between them. This packing method takes particular advantage of the viscosity of gels.

In both the sixth and seventh embodiments, the filling material such as a gel is introduced into the pressure compartment 48 for subsequent packing via a filling hose 64 under the control of a valve 66. The filling hose 64 runs as an umbilical beside the hold-back wire 18. If the filling material is granular, it can be blown through the filling hose 64 into the pressure compartment 48 as a fluidised mass of particles entrained in compressed air. A pressure relief valve, not shown, can be provided to allow air to leave the pressure compartment 48 as it fills with the filling material.

When the pressure compartment 48 is nearly full as shown in FIG. 15a, the trailing pig 44 is pulled toward the leading pig 42 by the variable-length link to reduce the length and hence the volume of the pressure compartment 48. Consequently, the fluid mass 50 of filling material fills the remainder of the pressure compartment 48, as shown in FIG. 15b, and applies radially-outward pressure against the interior of the pipe stalk 10 to resist wrinkling of the liner sleeve 60. As a gel or a granular filling material will stiffen under this pressure, the pressure compartment 48 is preferably shortened only after the mandrel 14F, 14G has bent along its central longitudinal axis in response to corresponding bending of the pipe stalk 10.

The mandrels 14F, 14G of FIGS. 15a, 15b and 16 have another feature in common, namely an extensible hose 68 extending through the mandrel 14F, 14G from outside the trailing pig 44 to outside the leading pig 42. This hose 68 allows the Interior of the pipe stalk 10 downstream of the mandrel 14F, 14G to communicate with ambient air for pressure equalisation. Alternatively or additionally, a breathing hole or a valve such as a check valve or pressure control valve may be provided on the leading end of the first-reeled pipe stalk 10 to equalise vacuum downstream of the mandrel 14F, 14G due to its piston effect relative to the moving pipe stalk 10.

The variable-length link of the mandrel 14F of FIGS. 15a and 15b comprises a rod 70 on its central longitudinal axis that can slide longitudinally through the central shaft 72 of the leading pig 42. The leading end of the rod 70 is connected by a wire or cable 74 to the trailing pig 44. The rod 70 has a toothed rack surface that is engaged by a pinion 76 driven by a motor 78 through a gearbox 80 mounted on the outer side of the trailing pig 44. Power for the motor is provided through a power line 82 that runs as an umbilical beside the hold-back wire 18.

Conversely, the variable-length link of the mandrel 14G of FIG. 16 comprises a double-acting hydraulic jack 84 that is disposed in the pressure compartment 48. The jack 84 is pivotably connected at opposite ends to the leading and trailing pigs 42, 44 to pull them together or push them apart. Hydraulic fluid for the jack 84 is provided under pressure through an hydraulic hose 86 that runs as an umbilical beside the hold-back wire 18.

Mandrels of the invention that have a pressure compartment 48 preferably use a gel as a fluid mass to fill that compartment 48. Examples of such gels are MEG (monoethylene glycol) gels and silicone gels. Alternatively, wax can be used. EP 0009281 also discloses a potentially suitable type of gel that comprises vegetable oil, fatty acid and a particulate filler such as calcium carbonate.

Optionally, biodegradable gel such as food gel, jelly, gum or pectin could be considered. Water solubility of such gels allows for easy evacuation during flushing and cleaning after use of the mandrel, while biodegradability aids disposal.

Carrageenans (E407) have the ability to form gels at ambient temperature and so are widely used as thickening and stabilising agents. They have pseudo-plastic properties, meaning that their viscosity reduces under shear stress and is recovered once the shear stress is removed. This means that they are easy to pump but stiffen again afterwards. Consequently, carrageenans would be useful for filling the pressure compartment 48 and subsequent removal from the compartment 48 by pumping but they stiffen when packed into the pressure compartment 48 ready for spooling.

Where a granular filler material is used as a fluid mass in the pressure compartment 48, grains of polymer or PTFE are preferred to sand to avoid damaging the inner surface of the pipe stalk 10 and for lower friction. Low friction between the grains is also helpful to improve the fluidity of the mass and to promote packing in the pressure compartment 48 under external inward pressure.

Many other variations are possible without departing from the inventive concept. For example, it is possible for welding and coating stations of a spoolbase to be separated by the length of a pipe stalk so that welding can be performed at an upstream station in parallel with coating at a downstream station.

Optionally, a mandrel of the invention can be designed also to clean the interior of a pipe stalk, thanks to additional pig plates or cups located inside a downstream end of the mandrel.

The fluid mass could be held in the pressure compartment in one or more flexible bags capable of packing or being packed and of conforming to the internal pipe wall.

A winch is merely an example of a hold-back device, whose purpose is to withstand the reaction to friction between the mandrel and the inner surface of the pipe stalk. In addition, the hold-back device should be easily disconnectable from and reconnectable to the hold-back wire. A winch is preferred as the hold-back device because its adjustability increases the versatility of the system.

The invention claimed is:

1. A method of bending an elongate pipe continuously along a longitudinal axis of the pipe when spooling the pipe onto a reel, comprising:
    advancing the pipe longitudinally through a bending zone where at least part of the pipe undergoes plastic deformation during bending along the longitudinal axis;
    while the pipe advances through the bending zone, applying tension through an elongate tensile hold-back element that is anchored outside a trailing end of the pipe and extends internally along the pipe to hold an internal mandrel at the bending zone against frictional force arising between the internal mandrel and the pipe advancing past the internal mandrel; and
    by means of the internal mandrel, resisting radially-inward deformation of an inner surface of the pipe with respect to the longitudinal axis during bending.

2. The method of claim 1, comprising using an external mandrel to bend the pipe along the longitudinal axis at the bending zone.

3. The method of claim 2, wherein the pipe is bent during spooling onto a reel that serves as the external mandrel.

4. The method of claim 1, comprising attaching the hold-back element to the internal mandrel when the internal mandrel is inside the pipe.

5. The method of claim 1, comprising:
    pausing movement of the pipe through the bending zone;
    detaching the hold-back element from the internal mandrel;
    withdrawing the hold-back element from the pipe;
    attaching an additional pipe section to a trailing end of the pipe;
    inserting the hold-back element to extend internally along the additional pipe section and the pipe to the internal mandrel;
    reattaching the hold-back element to the internal mandrel; and
    resuming movement of the pipe through the bending zone.

6. The method of claim 5, comprising aligning the pipe and the additional pipe section with an internal line-up clamp before attachment.

7. The method of claim 1, comprising causing the internal mandrel to bend to match bending curvature of the pipe at the bending zone.

8. The method of claim 7, comprising allowing or causing angular misalignment between longitudinally-spaced pipe-engaging elements of the internal mandrel by flexing or hinging of a link disposed between those elements.

9. The method of claim 8, wherein the link acts in tension.

10. The method of claim 1, wherein the internal mandrel bears against the inner surface of the pipe to resist radially-inward deformation of the inner surface of the pipe.

11. The method of claim 1, wherein the internal mandrel applies radially-outward fluid pressure against the inner surface of the pipe to resist radially-inward deformation of the inner surface of the pipe.

12. The method of claim 11, comprising exposing the inner surface of the pipe directly to a pressurised fluid confined by longitudinally-spaced seals of the internal mandrel that seal against the inner surface of the pipe.

13. The method of claim 12, comprising bending the internal mandrel to conform to bending curvature of the pipe at the bending zone before pressurising the fluid mass.

14. The method of claim 11, wherein the internal mandrel is filled with a substantially incompressible fluid mass and the fluid mass is pressurised in the internal mandrel after filling.

15. The method of claim 14, wherein the fluid mass is confined in a pressure compartment of the internal mandrel and is pressurised by contracting the pressure compartment.

16. The method of claim 14, wherein the fluid mass is caused to thicken or solidify when pressurised.

17. The method of claim 1, comprising adjusting the longitudinal position of the internal mandrel relative to the bending zone as the pipe advances through the bending zone.

18. The method of claim 17, comprising positioning the internal mandrel to encompass and extend longitudinally beyond the bending zone along the pipe.

19. The method of claim 1, comprising equalising air pressure in the pipe ahead of and behind the internal mandrel by allowing air to flow through the internal mandrel.

20. The method of claim 1, comprising measuring hold-back tension applied to the internal mandrel to detect excessive resistance to movement of the pipe past the internal mandrel and if such a condition is detected, generating an alarm or stopping movement of the pipe.

21. The method of claim 20, comprising allowing the internal mandrel to move with the pipe while movement of the pipe stops.

22. A method of bending an elongate pipe continuously along a longitudinal axis of the pipe when spooling the pipe onto a reel, comprising:
   providing a lined pipe suitable for use in transporting fluids in subsea installations;
   advancing the lined pipe longitudinally through a bending zone where at least part of the lined pipe undergoes plastic deformation during bending along the longitudinal axis;
   applying tension through an elongate tensile hold-back element that is anchored outside a trailing end of the lined pipe and extends internally along the lined pipe to hold an internal mandrel at the bending zone against frictional force arising between the internal mandrel and the lined pipe advancing past the internal mandrel while the lined pipe advances through the bending zone; and
   resisting radially-inward deformation of an inner surface of the lined pipe with respect to the longitudinal axis during bending with use of the internal mandrel.

* * * * *